3,810,800
METHOD OF PRODUCING LAMINATED STOCK
MATERIALS AND PRODUCTS
Martin Doll, Patterson, N.C., assignor to Cellu
Products Company, Patterson, N.C.
Original application Sept. 30, 1969, Ser. No. 862,252, now Patent No. 3,642,550, dated Feb. 15, 1972. Divided and this application Jan. 11, 1972, Ser. No. 216,939
Int. Cl. B32b 5/18
U.S. Cl. 156—78        6 Claims

ABSTRACT OF THE DISCLOSURE

Liquid resistant shipping cartons and the like, and liquid resistant materials particularly adapted for construction of such cartons, are produced in accordance with a method wherein sheet thermoplastic material is formed into a foraminous web having openings therethrough perpendicular to opposing faces thereof and webs of paper are adhered to the opposing faces of the thermoplastic material web.

---

This application is a division of application Ser. No. 862,252, filed Sept. 30, 1969, and which issued as U.S. Pat. No. 3,642,550 on Feb. 15, 1972.

This invention relates to packaging materials, and particularly to a method of producing cartons and the like and laminated materials to be assembled into cartons and to products produced in accordance with such methods. More particularly, it has been determined that improved liquid resistant laminated materials and cartons shaped from the improved materials may be provided by lamination of webs of liquid resistant paper to the opposing faces of a spacing web of thermoplastic material. The spacing web of thermoplastic material is formed by slitting and manipulating a sheet of thermoplastic material to open the incisions therein into a honeycomb-like form so that the spacing web produced has openings therethrough perpendicular to the opposing faces thereof. The thermoplastic material of the spacing web may be heat-set in the opened form.

The present invention has particular utility in the shipment of proudcts which are conventionally handled in a wet condition or which are likely to become wet during shipment. Examples of such products are fresh poultry and produce, which in the past have frequently been packed into a shipping carton and iced immediately before shipment is made. Where such cartons have been of conventional corrugated paperboard construction, difficulty has been encountered in maintaining structural strength of the carton throughout the handling of the contained product. For example, the cores of conventional corrugated paperboard are materially weakened when wet and due to the construction of such paperboard it is substantially impossible to keep such cores from becoming wet under the foregoing conditions without so greatly increasing the cost as to render such cartons uneconomical.

With the foregoing in mind, it is an object of the present invention to produce an economical carton material which has improved resistance to liquid so as to maintain the strength of the carton throughout handling of a product shipped therein. In realizing this object of the present invention, advantage is taken of the characteristics of thermoplastic materials, adapted to methods of producing a spacing web for lamination between webs of liquid resistant paper.

It is a further object of the present invention to provide a method of producing laminated material by which certain undesirable characteristics of corrugated cardboard as heretofore used in shipping cartons and the like are avoided while other desirable characteristics for a carton which is to contain a refrigerated product are enhanced. In realizing this object of the present invention, a sequence of steps is followed which includes the slitting of a sheet of thermoplastic material in a predetermined pattern of spaced incisions, the glueing and zig-zag folding of the thermoplastic material, and the opening of the slitting sheet into a foraminous web having multiple cells each extending through the web perpendicular to the opposing faces thereof and independent of any other adjacent cells.

The independence of the multiple cells extending through the spacing web of thermoplastic material provides improved thermal insulating effects and limits the possible distribution of any liquid which may enter into the interior of the laminated carton material.

Some of the objects of the invention having been stated, other objects will appear as the description proceeds, when taken in connection with the accompanying drawings, in which—

Figure 1:
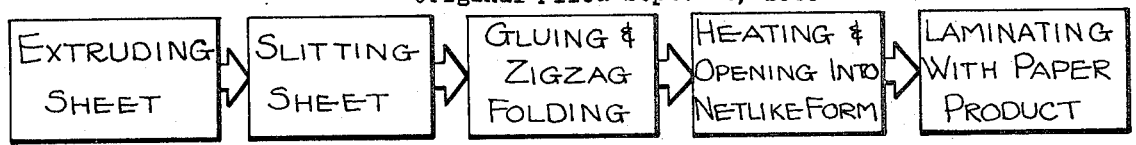
FIG. 1 is a flow diagram of steps to be followed in practicing the method of the present invention.

Referring now more particularly to the drawings, the method and product of the present invention are there illustrated, with the sequence of steps included in the method of the present invention being shown in a flow diagram and by drawings of apparatus and products in various stages of formation. At the outset, it is to be noted that the materials herein referred to as sheet materials are distinguished by the relative thicknesses of the materials from film materials of types which are widely known and used. Typically, a film material has very little thickness, being measured in mils or hundreths of an inch, and is dimensionally flexible by virtue of having susbtantially no rigidity in the plane of the film. As used in the practice of the present invention, sheet material has substantially greater thickness than films and has significant rigidity in the plane of the sheet as compared to the dimensional flexibility of film.

The present invention uses to advantage a characteristic of thermoplastic materials referred to herein as "elastic memory," by which is meant that property of thermoplastic materials which causes the material to maintain a particular form or shape until the material is either destroyed or deformed while at an elevated temperature. Typically, the elastic memory of a thermoplastic material is overcome by heating the material to a predetermined temperature characteristic of the particular material, deforming the material while at or above the elevated temperature, and then cooling the material below the predetermined temperature to set the material in a newly imparted shape. A material so formed is herein referred to as having been "heat-set."

In certain instances, to be discussed more fully hereinafter, it is preferred that thermoplastic material used in producing a foraminous spacing web be an expandable material. As herein used, the phrase "expandable thermoplastic material" describes a type of material generally known in the thermoplastic industry and which has heretofore found use in packaging materials. Typically, expandable thermoplastic materials have closed cells and include a material which may be activated to expand the cells under controlled conditions. Agents incorporated into thermoplastic materials to lead to such expansion are herein referred to as blowing agents, and it is recognized that such agents may take the form of fluids which expand due to chemical reactions producing gas or which expand due to physical actions such as vaporization. One specific example of an expandable thermoplastic material contemplated as useful in the present invention is expandable polystyrene extruded in sheet form and including a gaseous component which expands on being heated or extruded with air contained in closed cells of the material and cold compressed to reduce the volume of the closed cells prior to handling of the sheet. In any instance, it is preferred that the blowing agent incorporated in the expandable thermoplastic materials used in practicing the present invention be thermally activable, so that subjection of the material to predetermined temperatures initiates action of the blowing agent and expands the closed cells of the thermoplastic material.

It is a characteristic of expandable thermoplastic materials that the ending density of the material may be controlled by varying the characteristics of the blowing agent used and the temperature to which the material is exposed during activation of the blowing agent. Thus, the particular composition of thermoplastic material and blowing agent and the processing parameters applied may provide an end result of material of relatively low density and good thermal insulating qualities. As will be pointed out more fully hereinafter, advantage is taken of this possibility in adaptation of the methods and products of this invention to the production of cartons for transport of products which require refrigeration.

Broadly viewed, the method of the present invention results in the production of a laminated material suitable for use in fabrication of cartons and the like by a procedure including the steps illustrated in the flow chart of FIG. 1. As there summarized, the method of the present invention may include the steps of forming thermoplastic material into sheet form, such as by extrusion; slitting a sheet of thermoplastic material in a predetermined pattern of incisions; gluing and zig-zag folding the sheet; heating the sheet to a temperature at which any elastic memory of the thermoplastic material is overcome; opening the sheet into a foraminous web while at the elevated temperature; and laminating the foraminous web with webs of paper.

Figure 2:
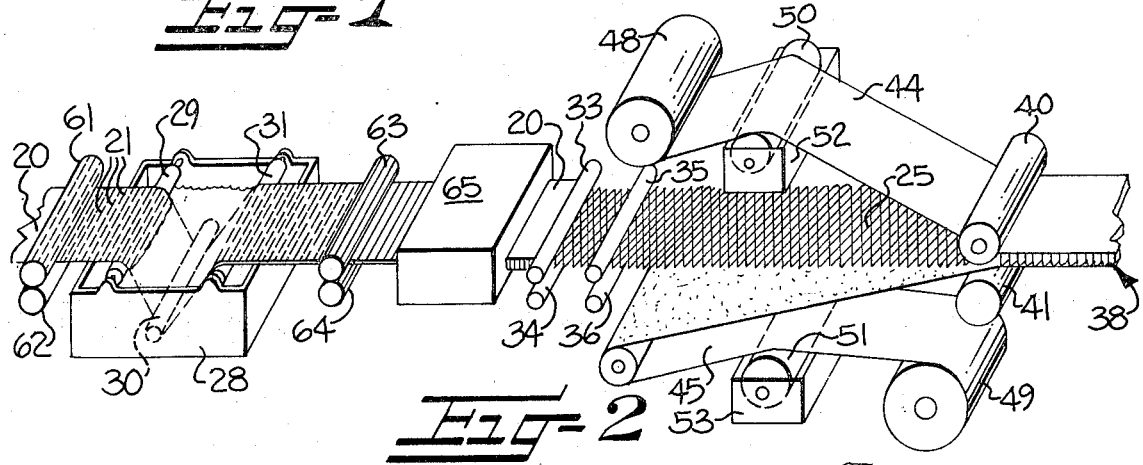
FIG. 2 is a schematic view of apparatus appropriate for performing the method steps in accordance with this invention.
Figure 3:
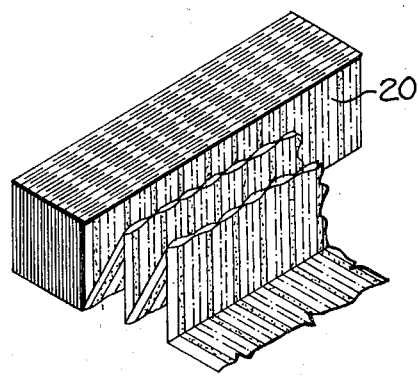
FIG. 3 is an enlarged perspective view of a portion of a slitted sheet of thermoplastic material, at one stage in the method of the present invention as practiced using the apparatus of FIG. 2.

Referring now to a particular species of carton material, a sheet 20 of thermoplastic material is shown in FIGS. 2 and 3, with a predetermined pattern of incisions 21 formed therein in accordance with the method of the present invention. In the instance of the sheet 20, the incisions 21 are in spaced rows of spaced incisions with the incisions in adjacent rows being in predetermined staggered relation. In particular, the incisions 21 are straight, elongate, equal length incisions cut into the sheet 20 in parallel straight rows with adjacent aligned incisions in each row being spaced apart a distance less than about one-half the length thereof and with the staggered relation of incisions in an adjacent row being such that an adjacent parallel incision equally overlaps the adjacent aligned incisions. This relationship among incisions can be noted from FIG. 3. Preferably, the incisions 21 extend entirely through the thickness of the sheets 20, in order to facilitate opening of the incisions as discussed hereinafter. However, it is recognized that the incisions 21 may extend into the sheet 20 for a distance less than the full thickness thereof, with the remaining portion of the sheet 20 being ruptured on opening of the incisions 21.

The sheet 20 to be incised may be either formed to specification by extrusion and the like or purchased from an appropriate source. Similarly, incisions may be formed in a number of different ways, including passing the sheet 20 between a pair of rollers one of which has spaced knives thereon or passing the sheet across a worktable and beneath a vertically reciprocating blade having spaced incising teeth. Other arrangements for supplying and incising a sheet will occur to persons skilled in the appropriate arts, and it is not intended that the choice of alternatives be restricted to those described herein. Further, it is recognized that the slitted sheet is a novel intermediate product and it is pointed out that such product is the subject of another patent application, Ser. No. 837,162, filed June 27, 1969 and entitled Methods of Producing Net-Like Thermoplastic Materials and Products, owned in common with this application and now U.S. Pat. No. 3,642,967.

Subsequent to slitting, if expandable thermoplastic material is used, the expanded sheet is transversely scored, as by spaced lines of compression, to increase the foldability thereof. Adhesive is applied to predetermined line areas of opposing surfaces of the sheet of thermoplastic material and the sheet is zig-zag folded while the folded portions are stacked compressionally to adhere the folds together in preparation for the step of opening the folded mass into foraminous web form 25. In incorporating these steps, the adhesive applied to line areas is so proportioned and disposed relative to spaced apart rows of spaced incisions formed in the sheet that on one face of the sheet the line areas cross between the slits in one aligned row, and on the other face of the slitted sheet, the lines pass between the slits of next adjacent rows. Stated differently, the lines along which adhesive is applied extend transversely to the rows of incisions formed in the sheet and are staggered as between the two opposing faces of the sheet by a distance approximately equal to the length of the incisions. Lines of adhesive applied are indicated in FIG. 3, with the adhesive directly visible in that view being indicated by heavy lines and phantom lines being employed to illustrate lines of adhesive on the opposite face of the sheet.

Subsequent to the application of adhesive, the sheet 20 is folded in a zig-zag manner along fold lines corresponding to rows of spaced incisions therein and along the score lines when expanded thermoplastic material is being used. Folding in this manner is indicated generally in FIG. 3. The folded portions are then stacked compressionally one against the other to adhere the folds together by virtue of the lines of adhesive applied thereo, and to produce a tightly packed mass having a thickness greater than the thickness of the sheet material originally used. In the apparatus of FIG. 2, slitting is accomplished by a set of rollers 61, 62, having knives mounted therein at spaced locations thereabout. From the slitting rollers 61, 62, the sheet is trained over suitable rollers 29, 30, 31 for immersion in a bath of heated liquid maintained within a tank 28, and is then passed to scoring rollers 63, 64.

Adhesive application, zig-zag folding and compressional stacking proceed within an enclosed chamber identified as a housing 65 and suitably may be performed by structure similar to that disclosed in Lombard et al. U.S. Pat. 2,581,421.

Figure 4:
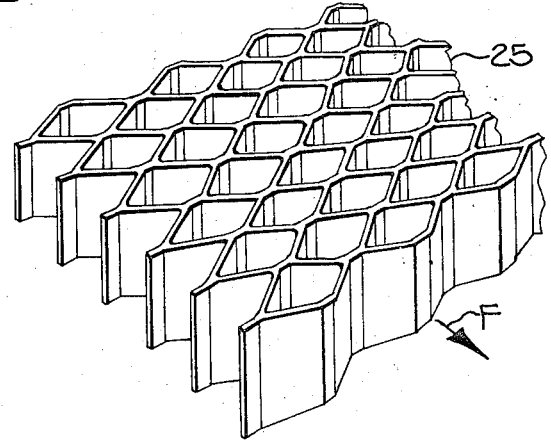
FIG. 4 is an enlarged view similar to FIG. 3, showing a foraminous spacing web as produced from the thermoplastic material sheet shown in FIG. 3.

Subsequent to forming, slitting, gluing and zig-zag folding of the sheet 20 of thermoplastic material, the slitted, glued and folded sheet is formed into a foraminous web 25 (FIG. 4) by opening of the slits 21 into a honeycomb-like shape, heat-setting of the web in the opened condition, and expanding the thermoplastic material where the material is an expandable material of the type discussed above. In shaping the sheet 20 into the foraminous web 25, the sheet is heated to a temperature at which the elastic memory of the thermoplastic material is overcome, so that the heated sheet will retain a shape imparted thereto during formation of the foraminous web. Specifically, such heating permits heat-setting of the material with the incisions opened and having a honeycomb-like form as shown in FIG. 4. Opening of the incisions is accomplished by exerting on the sheet a force having at least a component directed transversely to the rows of incisions in the sheet, such as a force applied in the direction of the arrow F in the instance of the web 25 of FIG. 4.

It is particularly contemplated that the heating of the sheet be accomplished by contacting the sheet with a heated fluid for the transfer of heat from the fluid to the sheet. In instances where the thermoplastic material is an expandable material having a thermally activable blowing agent therein, the temperature of the heated fluid is at least in excess of the temperature at which the blowing agent is activated. Where the material is an expandable polystyrene having air or other gaseous media incorporated therein as a blowing agent, an appropriate temperature for production conditions has been found to be a temperature of at least 220° F., with a temperature of 240° F. providing a particularly prompt action. In such instance, it is preferred that the subjection of the sheet 20 to a heated fluid be accomplished by immersing the sheet in a bath of heated liquid, such as may be maintained in a tank 28 (FIG. 2). Immersion may be carried on as a substantially continuous process, consistent with other steps described hereinafter, by training the sheet over and around suitably arranged guiding rollers 29, 30, and 31.

On the temperature of the sheet being raised to a temperature at which the sheet is sufficiently plastic for opening the incisions therein, opening force may be exerted on the sheet by passage of the sheet between successive pairs of rollers 33, 34 and 35, 36 with the second or downstream pair of rollers 35, 36 being driven with a linear surface speed slightly in excess of that of the pair of rollers 33, 34 which feed the material to the downstream rollers. As a result, the sheet 20 is drawn or pulled between the spaced pairs of rollers, resulting in the exertion thereon of the desired opening force. The sheet is then cooled to complete formation of a foraminous web.

While it is recognized that a continuous process involving substantially simultaneous heating and opening is particularly advantageous due to the cooperation thereof with further process steps as will be hereinafter described, and thus is to be preferred as the most efficient way of producing laminated materials in accordance with the present invention, it is further recognized that the foraminous web may be formed by opening the sheet 20 while in a cool condition, maintaining the sheet in the opened condition by maintenance of a force sufficient to overcome the elastic memory of the thermoplastic material, and thereafter heating the sheet to a temperature such as to overcome any elastic memory of the sheet. Further, the formation of the foraminous web need not be performed on a continuous basic or directly in conjunction with other process steps. That is, the preferred sequence of steps herein disclosed may be varied as desired or required for particular applications of thermoplastic materials, with such variation being found particularly favorable under certain working conditions where expandable materials of the type discussed above are being used. In those instances where heating and opening of a sheet to form a foraminous web proceeds substantially simultaneously, the use of an expandable thermoplastic sheet results in the expansion proceeding at substantially the same time.

Figure 5:
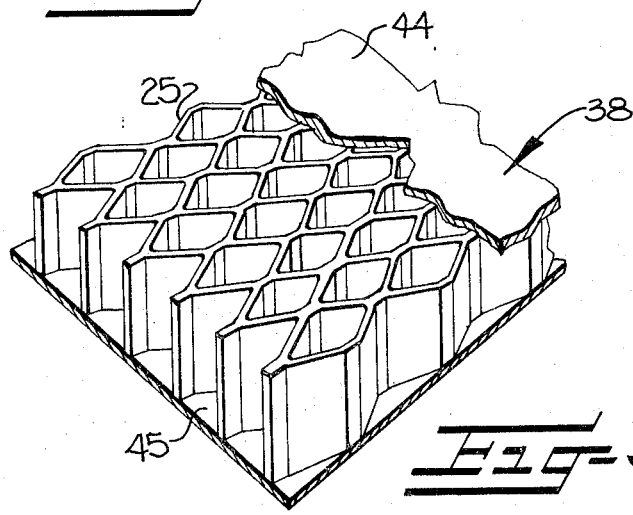
FIG. 5 is a view showing a carton material product as produced by the apparatus of FIG. 2.

The resulting foraminous web 25 serves as a spacing layer in a completed laminated material 38 (FIG. 5). Preferably, the laminated material is produced on a continuous basis in conjunction with the formation of the foraminous web 25 by passage of the foraminous web 25 between a pair of laminating rolls 40 and 41 (FIG. 2). On passage of the foraminous web 25 between the laminating rolls, webs 44, 45 of paper are adhered to the opposing faces of the foraminous web 25. Preferably, as shown, each of the webs 44, 45 of paper is advanced from a storage roll, respectively identified as 48 and 49, and is passed over a respective one of two adhesive applying rolls 50, 51. Each of the adhesive applying rolls is mounted for rotation within an adhesive storing tank, respectively identified as 52 and 53, or is otherwise supplied with adhesive to be coated on a surface of the respective web of paper.

In accordance with the present invention, at least one and preferably both of the webs 44, 45 of paper which are adhered to the opposing faces of the foraminous plastic material web 25 are liquid resistant craft papers. As a result, the laminated material (FIG. 5) has imparted thereto the characteristic of being liquid resistant and retaining structural integrity even when brought into contact with water or other liquids. Further, due to the nature of the openings through the foraminous web 25 and the non-absorbent character of thermoplastic material, the liquid resistant characteristic of the laminated material is retained even in the event that liquid comes in contact with the edges of the laminated material or a small area of the paper webs becomes punctured, to admit liquid into the interior. This is accomplished in part by the independent nature of the openings which extend through the foramainous web, in that admission of a liquid into one opening does not immediately result in drainage of the admitted liquid to other areas within the laminated material. Further, where the foraminous web 25 is of an expanded thermoplastic material, additional thermal insulation value is achieved for the laminated material in that the coefficient of heat transfer through the material is lowered.

Figure 6:
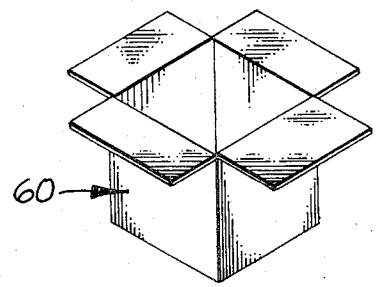
FIG. 6 is a reduced perspective view of a carton produced from the material of FIG. 5.

The laminated material produced in accordance with the method as described to this point may readily be fabricated into containers such as a carton 60 (FIG. 6) particularly constructed to receive food products subject to weepage, such as poultry carcasses during shipment from a poultry processing plant to a retail outlet such as a grocery store. The cutting and folding steps required to fabricate a carton such as a carton 60 may proceed in substantial similarity to those heretofore used in connection with conventional corrugated paperboard, and accordingly need not be described in detail here. At present, it is considered sufficient to point up the particular advantages derived by adopting the teaching of the present invention.

While the discussion above regarding production of honeycomb materials is particularly directed to one such process as presently practiced, it is noted that variations in such processes are also in present use, such as abrading selected areas of a folded and stacked mass rather than slitting the sheet material before stacking. It is specifically contemplated that variations in the process of producing honeycomb materials will be adapted to the methods and products herein disclosed and the choice of one particular process for disclosure herein is not to be considered as limiting the practice of this invention.

In the drawings and specification, there has been set forth a preferred embodiment of the invention, and although specific terms are employed, they are used in a generic and descriptive sense only and not for purposes of limitation.

That which is claimed is:

1. A method of producing a material particularly adapted for shaping into various articles, such as cartons, containers and the like comprising the steps of
   slitting a sheet of thermoplastic material having a thermally activable blowing agent therein in a predetermined pattern of spaced apart rows of spaced incisions with the incisions in adjacent rows being in predetermined staggered relation,
   applying adhesive to predetermined line areas of opposing surfaces of the sheet,
   zig-zag folding the slitted sheet on the rows of spaced incisions while stacking the folds compressionally to adhere the folds together along the line areas of adhesive,
   opening the folded, adhered sheet into a foraminous web by exerting thereon a force having a least a component directed transversely of the rows of incisions therein, heating the sheet to a temperature at which the blowing agent is activated to expand the material and to overcome any elastic memory thereof, cooling the heated sheet while maintaining the same in said foraminous web form to set the sheet in such form, and adhering a web of liquid resistant material to at least one of the opposing faces of the thermoplastic material web.

2. The method according to claim 1 wherein the step of heating the sheet occurs prior to the opening step.

3. The method according to claim 1 wherein the steps of heating and opening the sheet proceed substantially simultaneously.

4. The method according to claim 1 wherein the step of heating the sheet includes immersing the sheet in a bath of heated liquid.

5. The method according to claim 1 wherein the adhering step includes adhering a web of liquid resistant material to both of the opposing faces of the thermoplastic material web.

6. The method according to claim 1 including the further subsequent step of fabricating the laminated webs of liquid resistant and thermoplastic materials into a carton.

References Cited
UNITED STATES PATENTS

| | | | |
|---|---|---|---|
| 2,581,421 | 1/1962 | Lombard | 156—197 |
| 3,218,217 | 11/1965 | Geschwender | 161—68 |
| 2,820,733 | 1/1958 | Sorel | 156—229 |
| 2,981,631 | 4/1961 | Nagel | 156—78 |
| 2,770,406 | 11/1956 | Lane | 156—78 |
| 3,642,550 | 2/1972 | Doll | 161—68 |
| 3,642,967 | 2/1972 | Doll | 161—160 |

GEORGE F. LESMES, Primary Examiner

E. P. ROBINSON, Assistant Exmainer

U.S. Cl. X.R.

93—1 H, 36 M; 156—197, 227, 252; 161—68; 229—3.5 R; 264—Dig. 81